United States Patent [19]
Ament et al.

[11] Patent Number: 5,971,433
[45] Date of Patent: Oct. 26, 1999

[54] SAFETY NET DEVICE

[75] Inventors: Eduard Ament, Aichwald; Holger Seel, Aidlingen, both of Germany

[73] Assignee: Baumeister & Ostler GmbH & Co., Germany

[21] Appl. No.: 08/954,509

[22] Filed: Oct. 20, 1997

[30]     Foreign Application Priority Data

Oct. 23, 1996 [DE]  Germany .......................... 196 43 691

[51] Int. Cl.⁶ .................................................. B60R 21/06
[52] U.S. Cl. .......................................................... 280/749
[58] Field of Search ............................................ 280/749

[56]     References Cited

U.S. PATENT DOCUMENTS

| | | | |
|---|---|---|---|
| 1,186,865 | 6/1916 | Uttz ......................................... | 280/749 |
| 1,936,251 | 11/1933 | McCullough ............................ | 280/749 |
| 4,150,799 | 4/1979 | Takada . | |
| 4,202,577 | 5/1980 | Breitschwerdt et al. ................ | 280/749 |
| 5,551,726 | 9/1996 | Ament ..................................... | 280/749 |
| 5,820,187 | 10/1998 | Ament et al. ........................... | 280/749 |

FOREIGN PATENT DOCUMENTS

| | | |
|---|---|---|
| 0 649 778 A1 | 5/1994 | European Pat. Off. . |
| 27 49560 | 5/1979 | Germany . |
| 3418378 | 2/1986 | Germany . |
| 44 38 910 | 8/1995 | Germany . |
| 43 36 380 | 3/1996 | Germany . |
| 2021932 | 12/1979 | United Kingdom . |

*Primary Examiner*—Kenneth R. Rice
*Attorney, Agent, or Firm*—Leydig, Voit & Mayer, Ltd.

[57]     ABSTRACT

A safety net apparatus for preventing objects from being flung from a luggage compartment into the passenger space of a motor vehicle. The apparatus includes a safety net which can be pulled out and used at different pull out lengths from a winding shaft rotatably supported within a housing of the apparatus. The winding shaft includes a blocking device adapted for blocking rotation of the winding shaft as a consequence of an object being flung into the safety net for preventing further unwinding of the safety net from the winding shaft as a consequence of the forces acting on the net. Alternative blocking devices are disclosed which can be either manually operated, or which can be operated in response to acceleration or deceleration of the vehicle, acceleration in the rotary speed of the winding shaft, or transverse forces acting on the winding shaft.

25 Claims, 6 Drawing Sheets

SAFETY NET DEVICE

FIELD OF THE INVENTION

The present invention relates to a safety net arrangements or devices that mechanically separate the passenger space from the loading or baggage space in a station wagon or other passenger vehicle.

BACKGROUND OF THE INVENTION

Known safety net arrangements, such as shown in DE 43 36 380 C2, have an elongated housing provided with a run-out slot extending in a longitudinal direction. In the housing, a winding shaft is rotatably supported whereby one edge of a safety net is secured thereto. The other edge of the safety net is connected to a tension rod or pull out member which, when the safety net is in its wound up position, lies on the run-out slot and prevents further winding-up. The pull out member serves as an anchor when the safety net is tensioned and secured in the interior of the vehicle.

With the aid of a spring mounted within the housing and connected to the winding shaft, the winding shaft is biased in a wind-up direction. The length of the safety net in the unwound state generally is such that no significant supply of safety net remains on the winding shaft when the pull out or tension member is suspended in the vehicle.

If in the event of a collision of the vehicle objects present in the loading or trunk compartment of the passenger car are flung against the tensioned safety net and a small residual amount of the safety net will unwind from the winding shaft. This residual amount is necessary in order to accommodate tolerances in the car body within which the safety net is installed. The residual amount is so small, however, that no appreciable ballooning of the net occurs which could impair the protective functioning of the safety net. In other words, it will not allow the object to penetrate too far into the passenger space.

Such safety nets are needed not only when the rear seat bench of a station wagon is set upright, but when, for the purpose of increasing the cargo space capacity, the rear seat back is laid down. In this case, the housing of the safety net arrangement is at a much greater distance from the roof and correspondingly a greater length of safety net is necessary in order to provide the desired functioning. Conversely this means that with the back seat upright, the tensioned safety net amount would still be too great for a the usual effect. The objects flung into the net would unwind this great amount of safety net from the winding shaft so that there would arise a large balloon extending into the passenger space.

In order to avoid this ballooning effect in the case of an incompletely drawn-off safety net, it is known to provide on the run-slot of the housing a comb-like structure. This comb springs back opposite the plane in which the safety net is normally moved in drawing-out from the housing in order to hamper the pulling-out of the safety net as much as possible. The object flying into the safety net causes the safety net to be pressed against this comb so that the comb teeth hook in the meshes of the safety net.

Such arrangement has substantial disadvantages. First, when drawing out the safety net, it is not always ensured that the safety net will engage and be stuck in the comb teeth. Further, as a result of such engagement, when it does occur, wear or possible damage can occur to the net, which causes the net to age prematurely. A further substantial disadvantage lies in impairment of the safety net. It cannot be avoided that the comb teeth in a collision accident possibly cut through the threads of the safety net or cause them to tear, which creates the danger of failure of the safety net.

OBJECTS AND SUMMARY OF THE INVENTION

It is an object of the present invention to provide a safety net arrangement which permits use of different pull out lengths of the safety net and which requires no arrangement, upon activation of the safety net, for mechanically engaging and possibly damaging the net.

This object is carried out in a safety net having a housing which rotatably supports a winding shaft. The safety net leads from the winding shaft through an outward run-out slot, the edges of which are entirely smooth and without dentation. The safety net can be drawn out of the slot without damage at the edges of the run-out slot in order to be suspended in anchors in the interior of the automobile. The blocking of a further pull-off of the safety net in case of an accident is accomplished with the aid of a blocking arrangement or device which prevents the rotation of the winding shaft.

By reason of the blocking device, the safety net can be used in applications with full or partial pull out of the safety net, while effectively protecting the anchoring of the safety net on the winding shaft.

A motor device coupled to the winding shaft holds the safety net taut in every position by biasing the winding shaft in a winding-up direction of the safety net. The holding-taut of the safety net shortens the response time substantially in the event of danger.

The blocking arrangement of the safety net of the present invention has two operating states. In one of the two operating states the winding shaft is essentially freely turnable, namely, in both turning directions of the winding shaft, while in the other state a rotation of the winding shaft is blocked at least in unwinding direction.

The blocking arrangement in the simplest case is a one-direction ratchet gear, which acts as a type of freewheeling arrangement so that independently from any manipulations a winding of the net onto the winding shaft is possible. By manual actuation, the one-direction ratchet gear can be rendered inactive. In this state the safety net can be drawn out of the housing without hampering for the purpose of replacing the safety net in the automobile body.

In order to simplify the handling of the safety net, the blocking device has a control arrangement by which the blocking arrangement is switchable back and forth between the two states. This control device can be operated manually, it can operate independently from the vehicle acceleration or retardation, or it can be set in operation by an excessive acceleration of the winding shaft, which occurs when an object is flung into the safety net. Finally, it is possible to activate the control arrangement by a transverse force which acts on the winding shaft.

In order to improve the safety of the total arrangement at least two blocking devices are provided. These blocking devices are provided at each end of the winding shaft. These blocking devices can operate according to similar or different functioning principles. It is further possible to use three blocking arrangements, in which case two blocking arrangements are arranged on one end of the winding shaft and operate according to different principles, while at the other end the third blocking device is seated, which again is of a different construction or type.

As a further alternative, there can be provided a manually released control arrangement, which is released by vehicle acceleration to bring the blocking device into the blocking state. Two such annular blocking devices can be accommodated on both ends of the winding shaft. It is possible, further, to use only one such blocking arrangement, while on the other side of the winding shaft a blocking arrangement is seated, which is activated by the means that an object flung into the safety net evokes on the winding shaft a transverse force, whereby the winding shaft is lifted out of its bearing position in which it is freely turnable into a position in which the rotation is blocked. Further it is possible, instead of the manual actuation, to provide a fully automatic actuation. In this case the safety net is completely freely movable and the rotation of the winding shaft is not blocked until an excessive retardation of the vehicle occurs or the winding shaft is excessively accelerated. This system can be combined with a system of the same type at the other end of the winding shaft or with a system which functions by the means that the end of the winding shaft is radially displaced.

The blocking arrangement preferably presents a blocking member affixed to winding shaft, which cooperates with a locking member in the housing. Depending on the form of execution of the blocking arrangement, the blocking member is a blocking wheel affixed to the winding shaft, which wheel has blocking dents over the entire circumference. The blocking wheel can, however, also be a disk which carries only one or two teeth and which is radially movable with respect to the winding shaft.

The locking members may take different forms, namely blocking latches, blocking pushers, or hollow gear wheels seated in the housing, which are either fully fitted out with blocking teeth or carry only a few blocking teeth.

The control arrangement may comprise a ball borne in a trough, which ball is deflected from the trough by the acceleration and brings about a corresponding actuation. The control arrangement may, however, also be an inertia system which is connected with the winding shaft. Finally, the control arrangement can also be formed by a rest arrangement or deformable means that become activated when transverse forces act on the winding shaft and shift the winding shaft radially in the a bearing arrangement.

Other objects and advantages of the invention will become apparent upon reading the following detailed description and upon reference to the drawings, in which:

Figure 1:
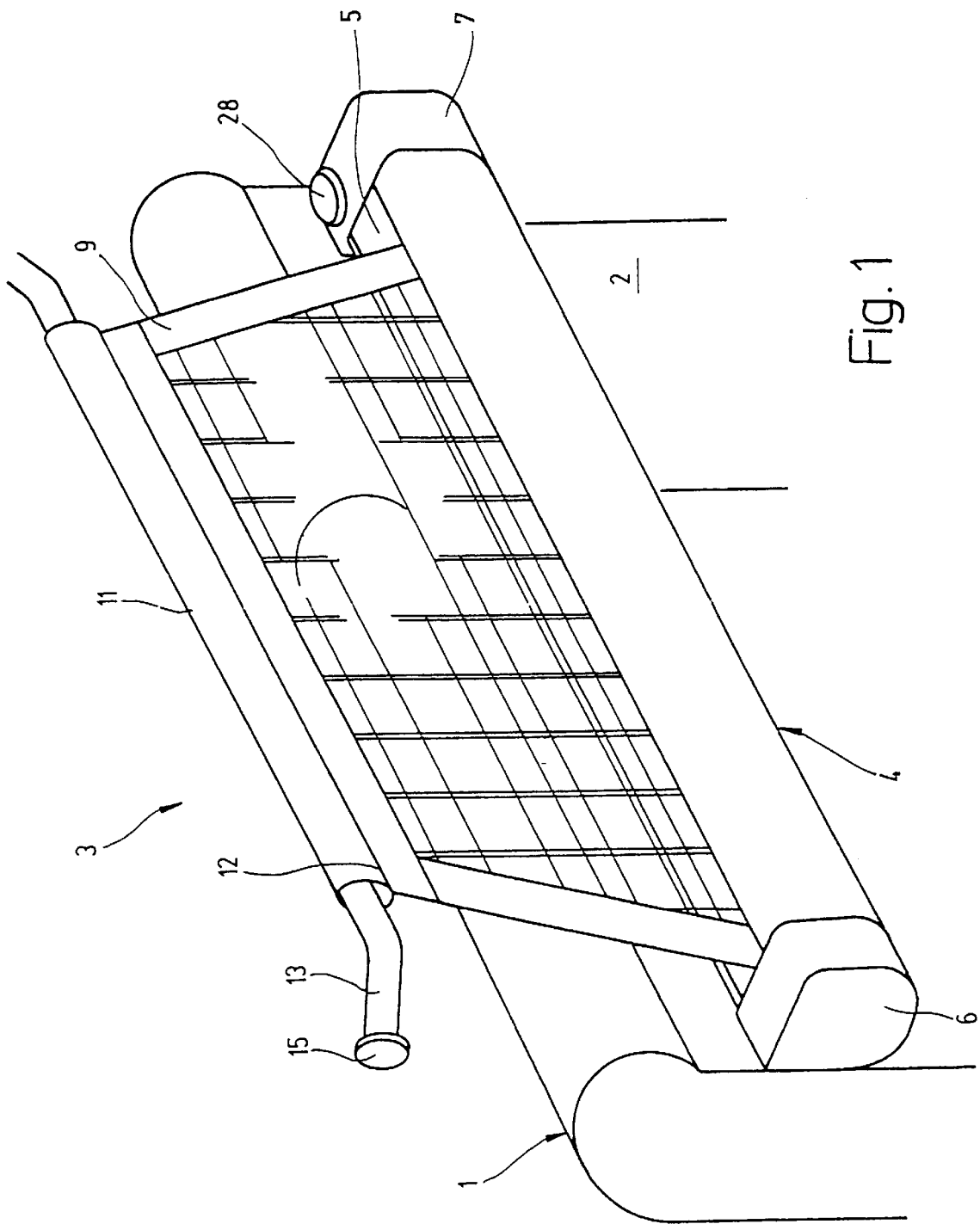
FIG. 1 is a perspective of a safety net arrangement or device according to the invention fastened to the backside of a rear seat back of a passenger vehicle, with the safety net in a partially drawn out condition.

While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWINGS

Referring now more particularly to FIG. 1 of the drawings, there is shown a illustrative safety net arrangement or device 3 according to the invention, mounted on the back side 2 of a back rest 1 of a passenger vehicle, such as a station wagon. The safety net arrangement 3 in this case is mounted adjacent an upper edge of the back rest 1 and is shown with the outer end of the safety net in a partially drawn out, detached position. It will be appreciated that the representation in FIG. 1 corresponds to the viewing angle from the rear open baggage compartment flap of a station wagon.

The safety net arrangement 3 has an elongated housing 4, which extends over the width of the rear seat rest 1 and is provided on its upper side with a smooth-edged outlet slot 5. The outlet slot 5 extends from one end cap 6 to an oppositely lying end cap 7 of the housing 4.

Figure 2:
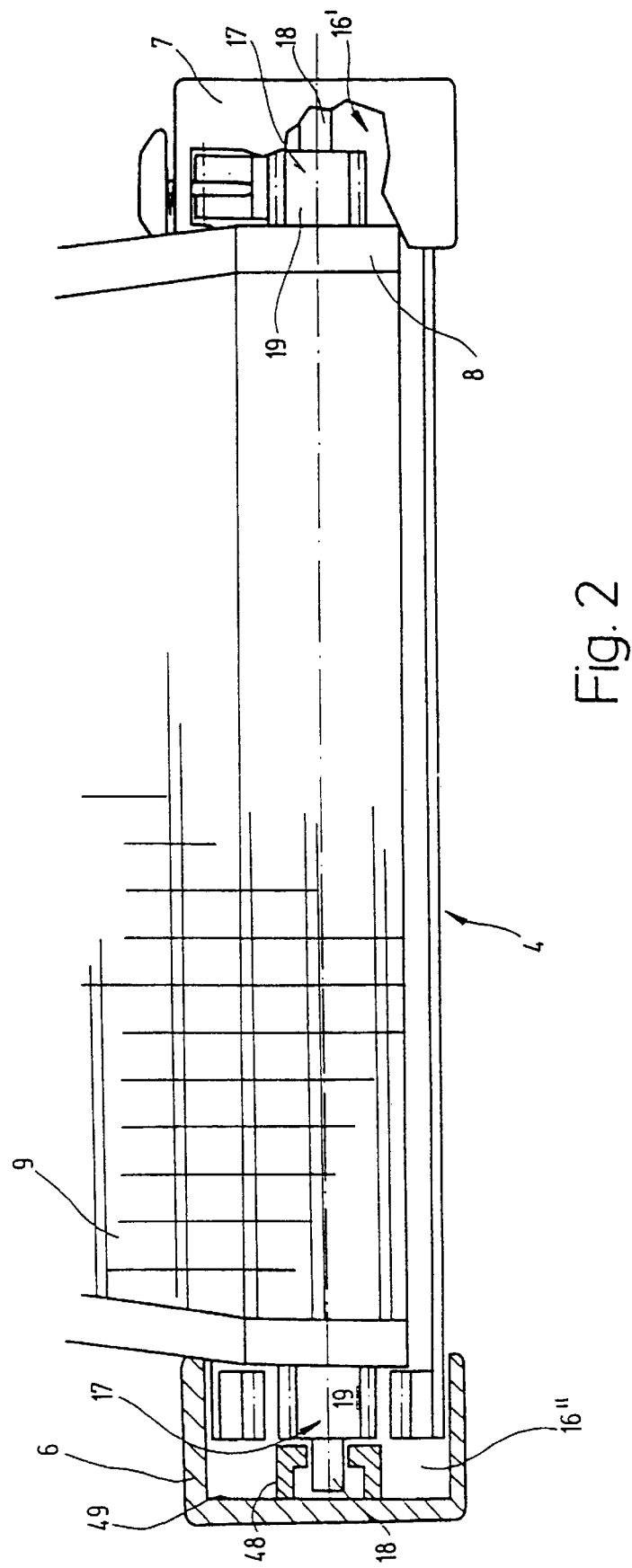
FIG. 2 is a fragmentary section of the safety net arrangement shown in FIG. 1.

As is evident from FIG. 2, the housing 4 serves as a the bearing of a winding shaft 8 to which there is fastened one edge a safety net 9 which can be drawn through the slot 5 out of the housing 4. An edge 11 of the safety net 9 parallel to the winding shaft 8 is formed into a loop 12, through which extends a draw-out rod or tension member 13, which is provided on both ends with mushroom-type heads 15, which can be suspended in corresponding receiving pockets under the roof of the passenger car in which the safety net arrangement is mounted.

In the housing 4 there are arranged for the right and the left ends of the winding shaft 8 blocking arrangements 16', 16" the construction and functioning of which are explained with the aid of the theoretical representations in FIGS. 3 and 4, and 5 and 6, respectively.

The winding shaft 8 in this case has a right end formed with a shaft journal 17, which consists of a thinner or smaller diameter section 18 and a thicker or larger diameter section 19. The smaller diameter shaft journal section 18 plugs into an appropriate slide bearing (not further shown) present in the end cap 7. The larger diameter section 19 cooperates with the blocking arrangement 16', which consists of blocking member 21' affixed to the winding shaft 8 and of a locking member 22' cooperating with it, which is pivotably mounted in the end cap 7.

The blocking member 21' has the form of a ratchet wheel which is seated on the section 19 and is provided with a plurality of sawtooth blocking ratchet teeth 23'. The ratchet teeth 23' point counterclockwise in the unwinding direction of the safety net 9 of which a bale 24, wound on the winding shaft 8, is illustrated in dot-and-dashed lines.

The locking member is a locking latch 22', which swingable axially parallel to the winding shaft 8 at 25 for relative pivotal movement about a pivot axis 25. It carries on its end away from the pivot axis 25, a latch lug 26 which is designed for cooperation with the locking teeth 23'. With the aid of a pressure spring 27 formed as a screw spring the locking latch 22' is biased into engagement with the blocking wheel 21'.

In order to bring the locking latch 22' out of engagement with the blocking wheel 21', there is provided an operating knob 28 which has an operating head 29 and a cylindrical shaft 31 seated thereon. With the shaft 31 the operating knob 28 is guided in a cylindrical bore 32 adjacent the pivot axis 25. A screw spring 33 seated on the shaft 31 is supported on the outside of the cap 7 and lies at its other end on the underside of the head 29, in order to tension the operating knob 28 upward in the direction away from the locking latch 22'.

The operating knob 28 stands with its end opposite the head 29 of the shaft 31 on a step or shoulder 35 which is formed on the locking latch 22' in a zone between the pivot axis 25 and the locking lug 26.

On the end opposite from the pivot axis 25, the locking latch 22' is provided with a hook 36, which is arranged to cooperate with a hook 37 of a two-armed control lever 38. The hook 36 opens in the opposite direction to the hook 37.

The two-armed control lever 38 is pivotally supported at 39 axially parallel to the winding shaft 8 in the cap 7 and is biased by a pressure spring 41 located underneath the hook 37 into the engagement with the hook 36.

In the rest state, the two hooks 36 and 37 lie on one another over oblique surfaces 42 and 43; they are not hooked into one another.

The control lever 38 is provided on its end lying away from the hook 37 with a downward-pointing extension 44, which contains a trough 45 that opens downward towards a trough 46 in the end cap 7. Between the two troughs 45 and 46 there a ball 47 is interposed and acts as a control member.

Figure 5:
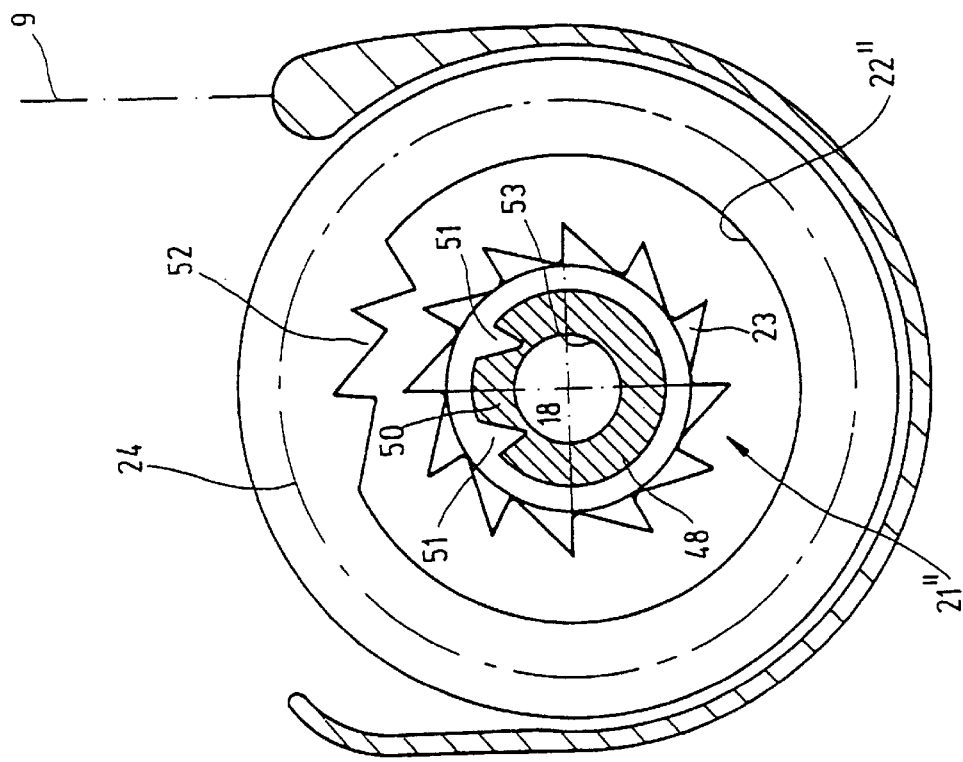
FIG. 5 is an enlarged fragmentary section of the blocking arrangement on the left side of the winding shaft of the illustrated safety arrangement.

The blocking arrangement 16" on the left side of the winding shaft 8 differs from the blocking arrangement 16' on the right side. FIG. 5 shows the construction in a theoretical position. There, functionally corresponding parts are designated with the same reference number, but with a double prime added.

The left end the winding shaft 8 is provided with a bearing journal 17", which is composed of the thicker or larger diameter section 19' and the thinner or smaller diameter section 18". On the larger diameter section 19" there is seated the blocking member 21", again in the form of a ratchet gear wheel with blocking teeth 23" which are aligned in such manner that they oppose the unwinding direction.

For supporting the shaft journal section 18", a bearing sleeve 48 is molded in one piece on the inner face side 49 of the end cap 6. This bearing sleeve 48 opens points in the direction of the adjacent winding shaft 8.

On the circumference of the bearing sleeve 48 a section 50 is defined by two desired-break points 51 in the form of two slots running parallel with spacing to one another, the spacing of which corresponds about to the diameter of the axial journal 18, and which continue over the length of the bearing sleeve 48.

The locking member 22" of the blocking arrangement 16" at the left end consists of a hollow wheel, which is fixedly anchored in the housing 4 and is coaxial to the bearing sleeve 48. This hollow wheel 22" is provided with three ratchet teeth 52, which are located adjacent the section 50 of bearing sleeve 48 bounded by the two slots 51, approximately opposite therefrom. The tooth head circle diameter of the ratchet wheel 23" is smaller than the tooth head circle diameter of the hollow wheel 22 so that the ratchet wheel 23", with unharmed bearing sleeve 48, is freely turnable.

The functioning of the thus far described safety net arrangement 3 is as follows: In its delivered state, before mounting in the passenger car, the safety net 9 is completely wound up on the winding shaft 8. The winding on the winding shaft 8 takes place with the aid of an appropriate spring motor, and located in the interior of the winding shaft 8, for example, adjacent the right shaft journal 18, and is there fixed in the end cap 7. In the driven-in state of the safety net 8 the pull rod 13 is drawn onto and rests on the smooth edges of the run-out slot 5. In this state the safety net arrangement 3 is anchored on the back side 2 of the rear seat rest 1.

In the delivered state the desired-break points in the form of the two notches 51 are unbroken or undamaged, in the sense that the bearing sleeve 48, with the cylindrical bore contained in it, forms a slide bearing for the shaft journal 18". In this state, the ratchet teeth 23" of the ratchet wheel 21" are located at a distance from the locking teeth 52. The diameter of the ratchet wheel 21" is chosen so that the outer diameter of the ratchet teeth 23 is less than the diameter of the inward extending tips of the locking teeth 52.

Figure 3:
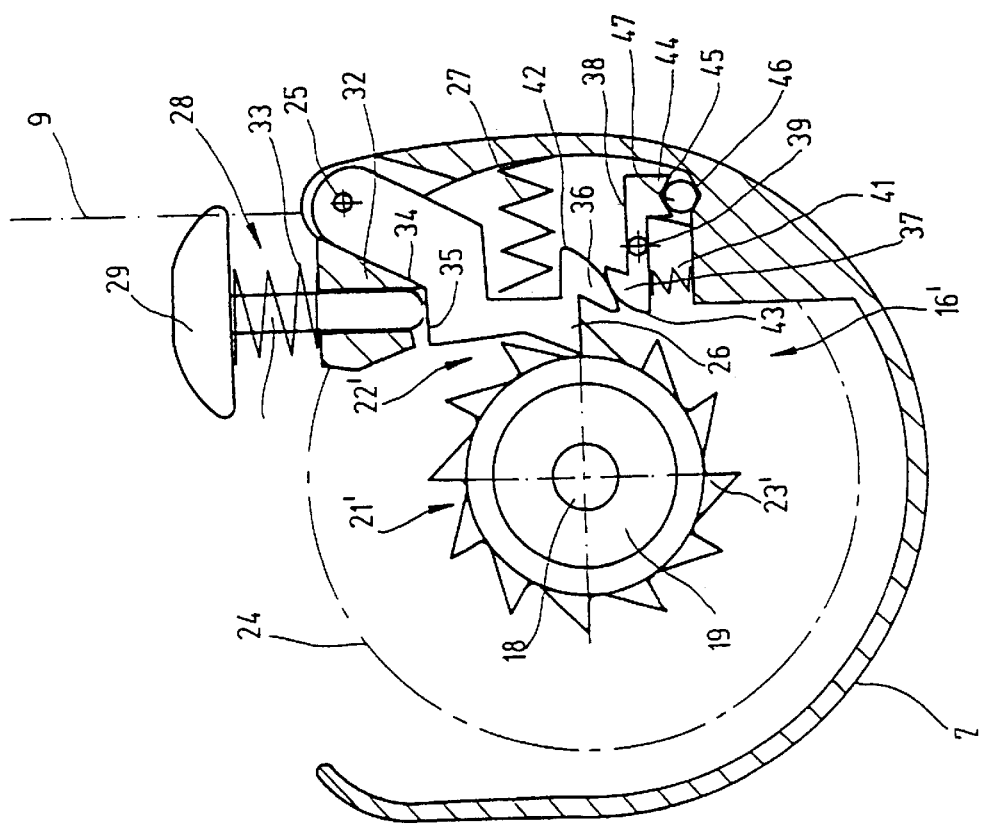
FIG. 3 is an enlarged vertical section of the blocking arrangement on the right hand side of the winding shaft of the illustrated safety arrangement shown in FIG. 2, with the housing opened.

The blocking arrangement 16' on the right side of the winding shaft 8 may be present in the state shown in FIG. 3. In this state the locking latch 22' engages into a tooth gap between ratchet teeth 23' of the ratchet wheel 21', whereby a rotation of the winding shaft 8 in the drawing-out direction of the safety net 9 from the housing 4 is blocked. In order to make it possible to draw out the safety net 9, the user depresses the operating knob 28, whereby the locking latch 22' is pivoted a distance about the pivot axis 25 against the action of the pressure spring 27. In this swinging movement, the hook 36 presses the hook 37 against the action of the pressure spring 41 in downward direction. At the end of the depression movement of the operating knob 28, the hook 36 is located at a point between the hook 37 and the pivot axis 39. In the course of this movement the tip of the hook 36 slides past the tip of the hook 37 so that this latter, under the action of the spring 41, again snaps upward. If the user now releases the operating head 28, which is moved back by the spring 33 again into its starting position, the locking latch 22' nevertheless remains out of engagement with the ratchet wheel 21'. In this out-of-engagement position the locking latch 21' is held by the cooperation of the two hooks 36 and 37. The blocking arrangement 16' finds itself thereby in its freewheeling position, in which the winding shaft 8 is freely turnable in both directions.

The user can then the safety net 9 out of the housing 4 so far as this is necessary so that the draw rod 13 can be suspended in automobile side anchorings. In the locking position between the two hooks 36 and 37, furthermore, the control ball 47 is contained between the two troughs 45 and 46. After suspending of the safety net 9, if the vehicle is strongly accelerated or braked, the control ball 47 between the two troughs 45 and 46 will incur a compensating movement as a consequence of its inertia. This compensating movement causes the control ball 47 to move to the edge of the two troughs 45 and 46, which are concave to one another, whereby the control lever 38 is lifted on its end opposite the hook 37. This lifting causes the hook 37 to be moved downwardly against the action of the spring 41 and out of the zone of movement of the hook 36. As a consequence of the effect of the pressure spring 27, now the locking latch 22' can again swing into the engagement position with the blocking gear wheel 21' so that the locking lug 21 can engaged into the gap between the adjacent blocking or ratchet teeth 23'.

When the safety net 9 again is to be driven in, it suffices to disengage the draw rod 13 from its anchorings in the vehicle and to let the safety net 9 enter the housing 4 under the action of the spring motor. Because of the sawtooth form of the blocking teeth 23' and of the locking lug 26, the rotation of the winding shaft 8 in the direction of the entry of the safety net 9 is not blocked. The blocking gear wheel 21' and the locking latch 22' in that case act as a one-direction ratchet or ratchet free-running.

For the renewed traveling out of the safety net 9, in contrast the operating knob 28 is again to be depressed, as this has already been described.

If a collision or accident should happen and an object from the cargo space should fly into the tensioned safety net 9, then the safety net 9 cannot be unwound further from the winding shaft 8. The blocking arrangement 16', by the engagement between the blocking wheel 21' and the locking lug 26 prevents such a rotation at the right end of the winding shaft 8.

Figure 6:
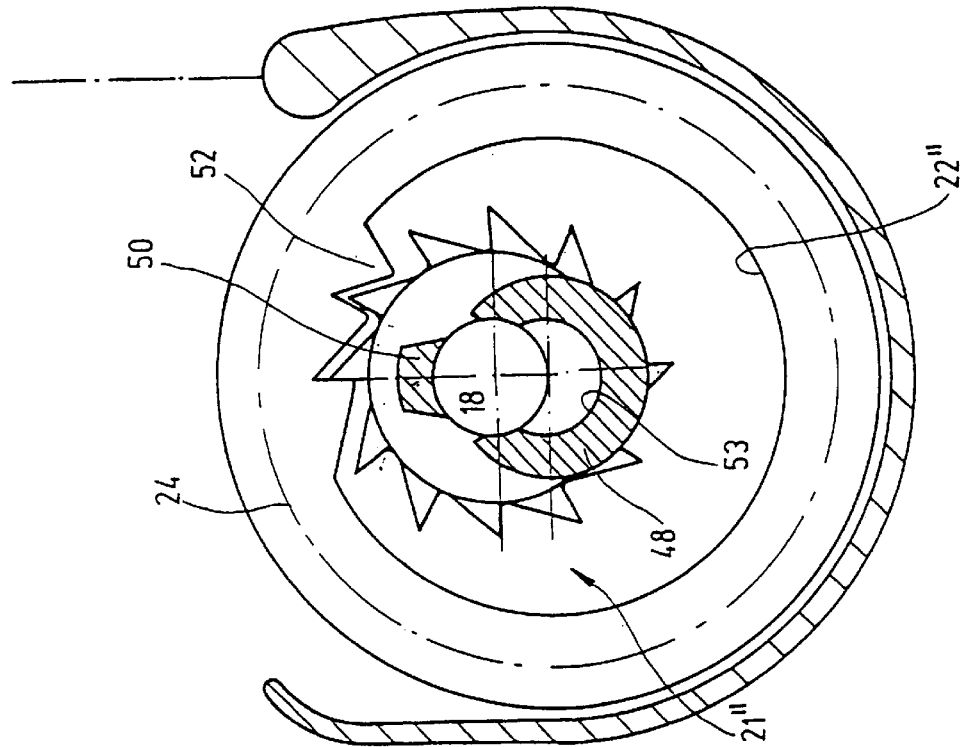
FIG. 6 is an enlarged fragmentary section of the blocking arrangement shown in FIG. 5, in another operating position.

Since the winding shaft 8 can no longer turn in that condition, the object is forced against the safety net 9 evokes on the winding shaft 8 a considerable transverse force. This transverse force leads to the result that on the left side of the winding shaft 8 the bearing sleeve 48 brakes open on the two slots 51 and pushes the interlying part 50 of the bearing sleeve 48 outward. The shaft journal 18" slips upward out of the now open bearing sleeve, as depicted in FIG. 6, whereby the blocking teeth 23 of the ratchet wheel 21" can come into engagement with the locking teeth 52. Thus, the other end, a left end in this case, of the winding shaft 8 also is secured against any rotation, with the shaft journal 18" being contained between the remaining flanks of the two slots 51 and the blocking wheel 21" in engagement with the hollow wheel 22" and its locking teeth 52.

Hence, the winding shaft 8 is blocked at both its ends against rotation and for restraining the object forced against the safety net 9.

In the event that the full cargo space is needed, the safety net arrangement 3 is not fastened as shown to the rear seat back 1, but, for example, in the foot space in front of the rear seat bench. This mounting requires, because of the greater distance, a much greater length of safety net, which may be available on the winding shaft 8. The handling of the safety net arrangement 3 in this case, in principle, is the same as is the blocking in the event of a collision.

As is evident from the foregoing description, on the right side the operating knob 28 acts together with the control lever 38 as manual/acceleration-dependent control arrangement in order to hold the blocking arrangement 16' in the freewheeling position. The blocking arrangement 16" on the left side, in contrast, is controlled by transverse force, the control arrangement being the two desired-break notches 51, which can be break open the bearing sleeve 48 on exceeding of a prescribed transverse force, so that the blocking member 21" can come into engagement with the blocking member 22".

A further difference between the two forms of execution of blocking arrangement lies in that the blocking arrangement 16 on the right side is present in its rest position in the blocking position in which a turning of the winding shaft 8 in unwinding sense is blocked. The blocking arrangement 16 on the left side, in contrast, has a rest position which corresponds to the free-wheeling position. It is only in an accident that the blocking arrangement is brought over into the blocking position.

Figure 4:
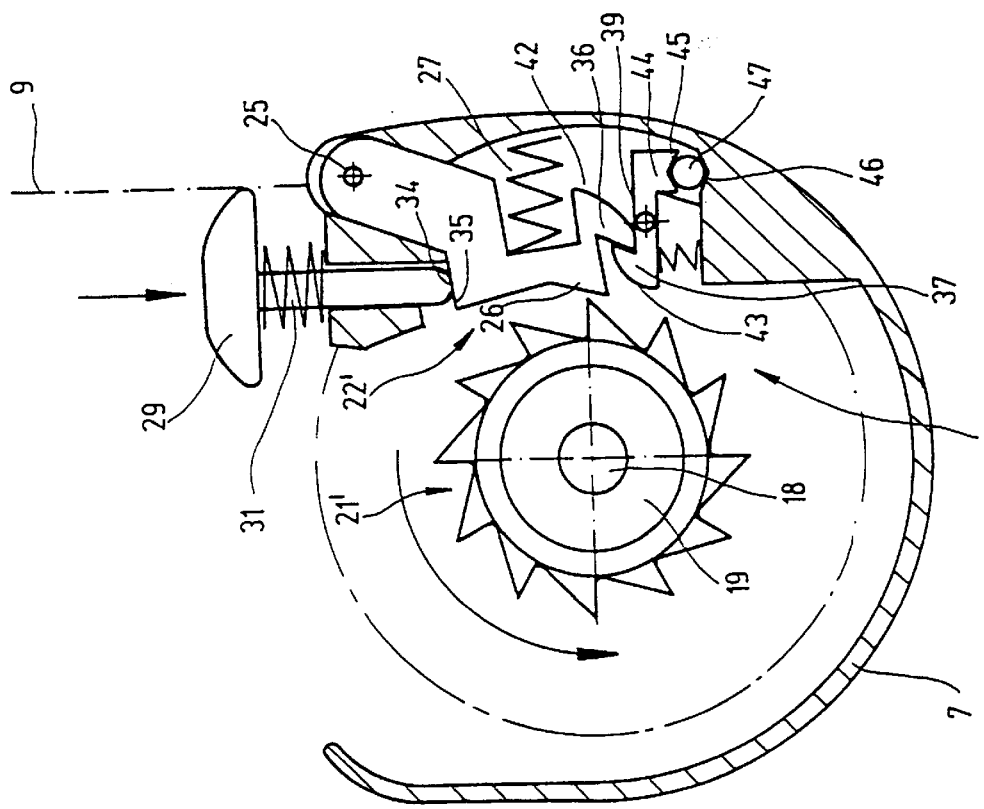
FIG. 4 is an enlarged vertical section of the blocking arrangement illustrated in FIG. 3 in another operating position.

Instead of using the blocking arrangement 16" shown on the left side in FIGS. 5 and 6, alternatively, blocking arrangement 16' shown in FIGS. 3 and 4 could be used there also.

Figure 7:
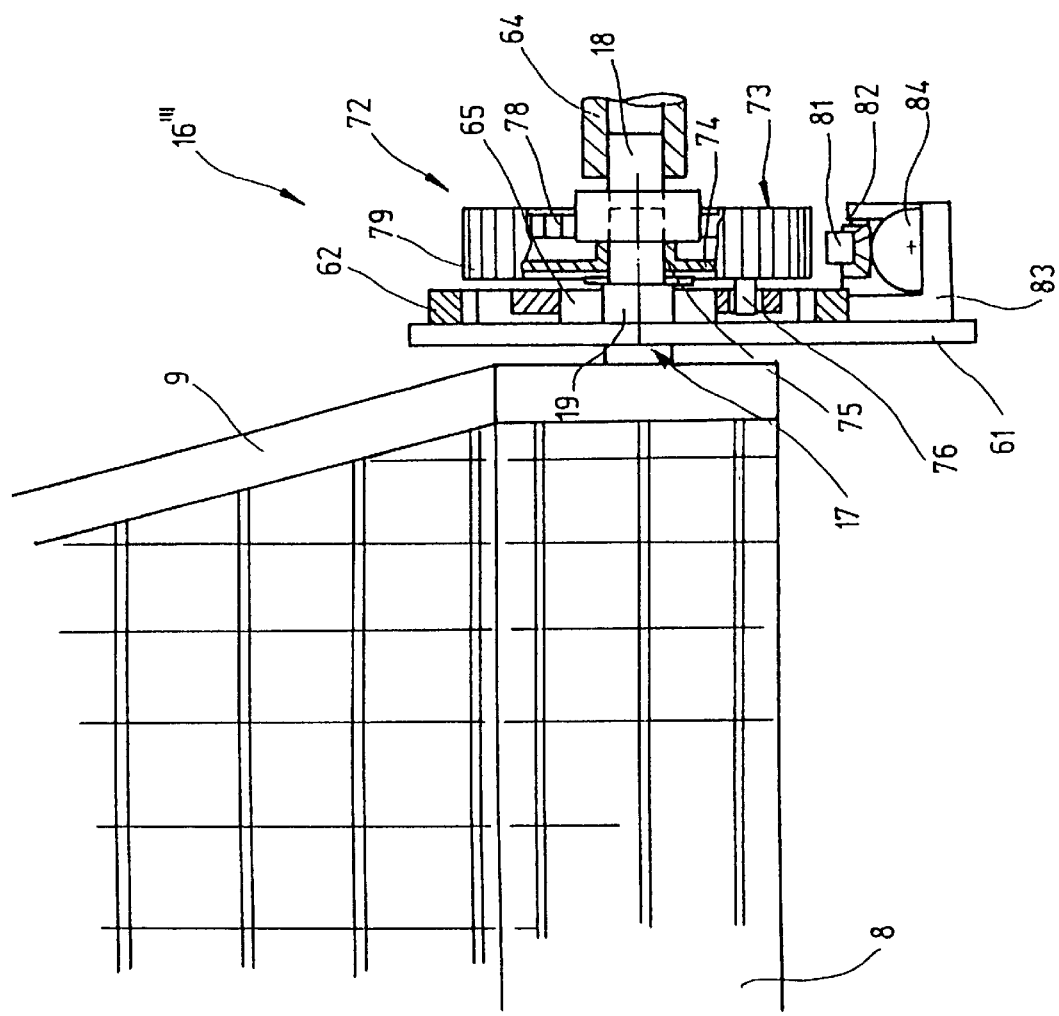
FIG. 7 is an alternative, acceleration-sensitive blocking arrangement for the right end of the winding shaft of the illustrated safety arrangement.
Figure 8:
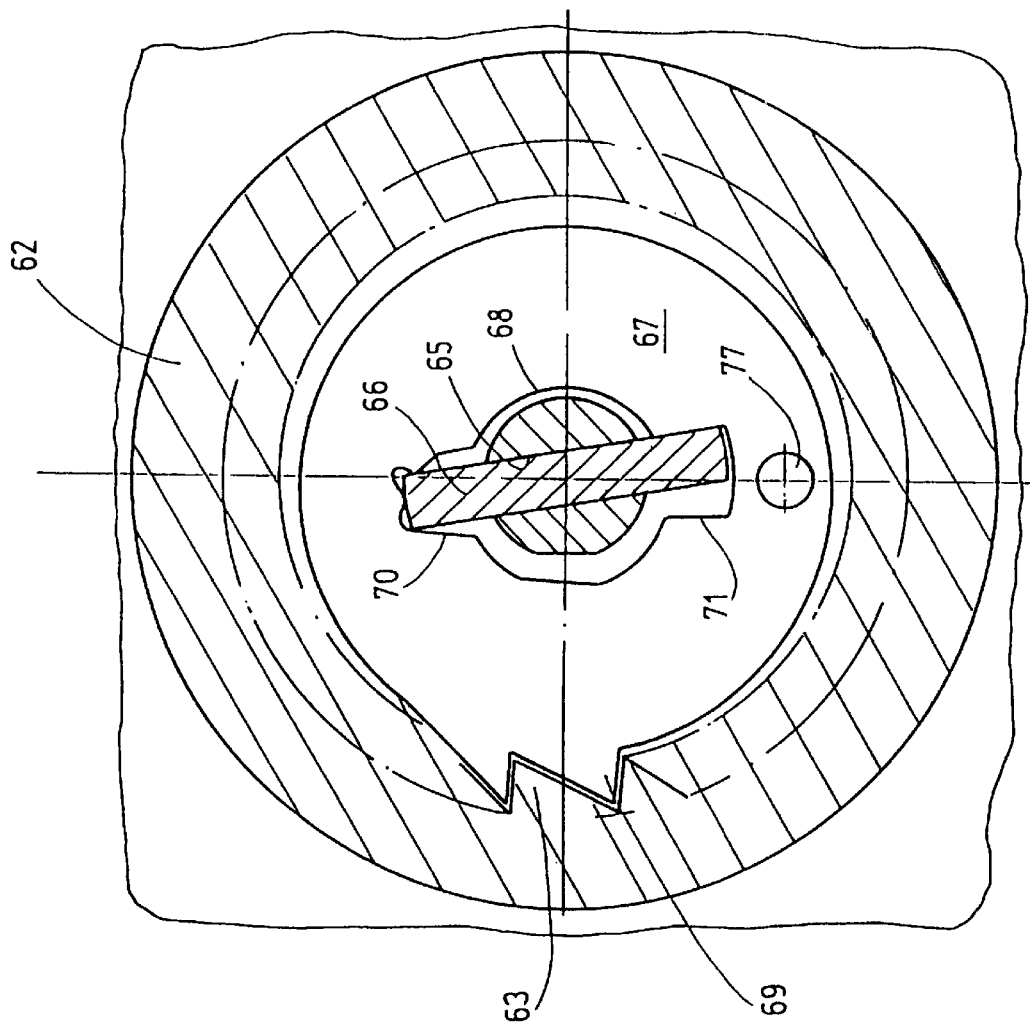
FIG. 8 is an enlarged, vertical, fragmentary section of a portion of the blocking arrangement as shown in FIG. 7.

FIGS. 7 and 8 show a blocking arrangement 16''' which is controlled by the acceleration or retardation of the vehicle or by an angular acceleration of the winding shaft 8. In this instance, the blocking arrangement, when in the rest state, is in the freewheeling condition, and only on exceeding of a prescribed vehicle acceleration or angular acceleration of the winding shaft 8 is the blocking arrangement activated in the sense that it blocks a rotation of the winding shaft 8.

In this embodiment, an assembling plate 61 located in the housing 4 has a fixedly seated hollow wheel 62 which serves as locking member. The hollow wheel 62 is provided with a large number of sawtooth-shaped locking teeth 63 which are directed counter to the unwinding direction of the winding shaft 8. Coaxially to the hollow wheel 62 there runs the shaft journal 17, the outer end or section 18 of which again is rotatably supported in a bearing sleeve 64. The shaft journal 17 extends through a bore in the plate 61 and is provided, in the region of a section 19, with an opening 65 leading transversely through it, in which a lash plate 66 is affixed, with opposite ends extending though the shaft section 19 by equal amounts.

A disk 67 having a passage opening 68 is affixed to the shaft section 19, and, namely, on the side of the plate 61 that lies away from the winding shaft 8. The disk 67 in this case is provided with two blocking teeth 69 on only one side. In the rest position, the disk 67 is in a position in which the blocking teeth 69 do not engage the locking teeth 63 of the hollow wheel 62. In order to achieve this, the passage opening 68 is provided on one side with a slit 70, the radial length of which, measured from the center of the disk 67, corresponds to the radial overhang of the lash plate 66. Furthermore, the slit 70 is tapered on its end lying away from the axis of the disk 67 so that the lash plate 66 can move exclusively in swinging motion, without its having any appreciable play in circumferential direction in the slit 70.

A further slit 71 is provided diametrically opposite the slit 70 with respect to the axis of the shaft journal 17, and is formed in such manner that its radial length again corresponds to the overhang of the lash plate 66 over the outer circumference of the section 19. The slit 71, however, is wider than the slit 70, whereby the lash plate 66 has play in a circumferential direction in the slit 71. Hence, the disk 67 in the position illustrated can pendulate back and forth laterally in the slit 70 with respect to its support and into an engagement position shown in FIG. 8, which the blocking teeth 68 engaging the gaps between the locking teeth 63, while in a position, not shown, the teeth can run past each other without scraping.

For controlling back and forth movement of the disk 67 between the two limit positions, there is present an inertial control arrangement or device 72. To this end, there is provided a sort of pot-form spring housing 73 with a housing bottom 74 and a bearing sleeve 75 molded on in one piece, with which the spring housing 73 is freely rotatable on the shaft journal section 18. The spring housing bottom 74 has a follower journal 76, which has an end extending into, with play, a bore 77 in the disk 67.

In the spring housing 73 there is accommodated a spiral spring 78, the outer end of which engages the spring housing 73 and the inner end of which is connected with the shaft journal section 18. Hence, the spring housing 73 is biased into an end position, and namely, into an end position in which the disk 67 lies with the edge of the slit 71 on the lash plate 66 and the teeth 63 and 68 are out of engagement.

The spring housing 73 is provided, furthermore, on its outer side with a gearing 79 which cooperates with a pusher 81. The pusher 81 is radially shiftable with respect to the spring housing 73 in a bore 82 contained in an overhang 83 of the plate 61. In this overhang 83 a control ball 84 is provided in a trough.

In operation, as long as no excessive acceleration forces are acting on the ball 84, it lies in its proper trough and the locking pusher 81 is not in engagement with the gearing 79 of the spring housing 73. Hence, through the action of the spiral spring 78 in connection with the spring housing 73 the disk 66 is biased into the end position in which the blocking teeth 68 can run free and unimpeded past the tips of the locking teeth 73. In such condition, the safety net 9 can be drawn out freely from the run-out slot 5.

In the event that in an accident an object is flung into the safety net 9, two largely independent systems become active. The penetration of the object into the safety net 9 leads to a drastic angular acceleration of the winding shaft 8. Because of its inherent moment of inertia the spring housing 73 cannot follow this angular acceleration. Despite the action of the spiral spring 78 it lags behind. The lagging leads to a radial swinging of the disk 67 on the shaft journal section 19. The center point for this swinging lies in the slit 70 and it is bounded by the entry of the blocking teeth 68 between the gap of the locking teeth 63. Since the disk 67 is otherwise non-rotatably bound over the lash plate 65 with the shaft journal 17, a further rotation of the winding shaft 8 is blocked.

Independently of the releasing of the blocking arrangement 16 by the inertia arrangement 72 which is controlled by the moment of inertia of the spring housing 73, there occurs still a further control which is dependent on the vehicle deceleration. Through collision accident there arises a relatively strong reduction in the speed of the vehicle, which leads to a rolling of the ball 84 out of its trough. It climbs the edge of the trough and in so doing forces the locking pusher 81 upward in the direction of the blocking gearing 79 of the spring housing 73. The spring housing 73 is therewith held fast independently of rotary inertia forces by the blocking pusher 81, whereby there comes about the same swinging of the disk 67, as is the case when the spring housing 73 lags in consequence of the moment of inertia.

As a further alternative embodiment, it will be understood that it would be possible to affix a blocking gear wheel to the shaft journal 17 and to use the blocking pusher 81, shown in FIG. 7, to hold this blocking gear wheel as soon as excessive retardation forces act on the vehicle, in which the safety net arrangement is located.

It will be further understood that the blocking arrangement at the other end of the winding shaft 8 can either be executed, as is shown in FIG. 7, or it can be formed as shown in FIGS. 3 and 5.

From the foregoing, it can be seen that the safety net arrangement has a winding shaft freely turnable in a housing, to which shaft a safety net is fastened with one edge. The safety net leads through an outflow slit from the housing to the outside, the outside-lying edge being joined with a pull bar.

To the winding shaft there are preferably allocated blocking arrangements at both ends, which prevent objects which are flung into the safety net in a collision accident from unwinding the safety net from the winding shaft with a ballooning affect. Different blocking arrangements can be used at both ends. These blocking arrangements can be designed according to the application, end use, or production costs, and in such manner that in the rest position they enable a free running of the winding shaft and are activated only in case of a severe retardation of the vehicle or a strong angular acceleration of the winding shaft. A blocking arrangement that acts as a one-direction ratchet has, however, the shortest response time, since it is in the blocking position from the outset.

We claim:

1. A motor vehicle safety net apparatus for preventing objects from being flung out of a baggage compartment and into the passenger space of a motor vehicle in the event of a driving accident comprising:
    a housing having a run-out slot extending parallel to the length of the housing,
    a winding shaft rotatably supported in the housing,
    a safety net adapted to be run off of and wound up on said winding shaft,
    said safety net having two longitudinal edges spaced from one another, one of said longitudinal edges being fastened to the winding shaft and the other of said longitudinal edges being connected to a draw-out member,
    a winding device cooperating with the winding shaft for rotating the winding shaft in a direction for winding-up the safety net on the winding shaft, and
    at least one blocking device for blocking rotation of the winding shaft as a consequence of an object being flung into the safety net and causing forces on the net in a manner which otherwise would unwind the safety net from the winding shaft.

2. The safety net apparatus according to claim 1 in which the winding device includes a spring motor which biases the winding shaft in a safety net wind-up direction.

3. The safety net apparatus according to claim 1 in which the blocking device has at least two operating states, one of which is a free wheeling state in which the winding shaft is freely rotatable and the other which is a blocking state in which the winding shaft is blocked against rotation in an unwinding run-off direction.

4. The safety net apparatus according to claim 1 in which the blocking device is a one-direction ratchet wheel which does not prevent turning of the winding shaft in a wind-up direction of the safety net.

5. The safety net apparatus according to claim 1 in which the blocking device has a control device for switching the blocking device between one operating state and another.

6. The safety net apparatus according to claim 1 in which the blocking device has a control device for switching the blocking device from a free wheeling state to a blocking state.

7. The safety net apparatus according to claim 1 in which the blocking device has a control device for switching the blocking device out of a blocking state into a free wheeling state.

8. The safety net apparatus according to claim 5 in which the control device is manually actuatable.

9. The safety net apparatus according to claim 5 in which the control device is activated in response to acceleration of the vehicle.

10. The safety net apparatus according to claim 5 in which the control device is activated in response to acceleration of the winding shaft.

11. The safety net apparatus according to claim 5 in which the control device is activated in response to transverse force on the winding shaft.

12. The safety net apparatus according to claim 1 in which the winding shaft has two different blocking devices.

13. The safety net apparatus according to claim 1 in which the blocking device includes a locking member disposed within the housing, and at least one blocking member affixed to the winding shaft for cooperation with the locking member.

14. The safety net apparatus according to claim 13 in which the blocking member includes a ratchet wheel affixed to the winding shaft, and said ratchet wheel has gear teeth over substantially its entire circumference.

15. The safety net apparatus according to claim 14 in which the gear teeth are sawtooth in form.

16. The safety net apparatus according to claim 13 in which the blocking device includes a disk mounted on the winding shaft, said disk having at least one blocking tooth and being shiftably movable with respect to the axes of rotation of the winding shaft.

17. The safety net apparatus according to claim 13 in which the locking member is a locking latch pivotably mounted on the housing.

18. The safety net apparatus according to claim 13 in which the locking member is a locking pusher shiftably supported in the housing.

19. The safety net apparatus according to claim 13 in which the locking member is formed with at least one locking tooth and is secured to the housing.

20. The safety net apparatus according to claim 13 in which the locking member is a hollow wheel mounted in the housing and formed with at least one locking tooth.

21. The safety net apparatus according to claim 20 in which the hollow wheel is formed with a plurality of equidistantly disposed locking teeth.

22. The safety net apparatus according to claim 5 in which the control device includes a ball disposed within a trough affixed to the housing.

23. The safety net apparatus according to claim 5 in which the control device includes a latch pivotably supported by the housing.

24. The safety net apparatus according to claim 5 in which the control device includes a rotary inertia member mounted on the winding shaft.

25. The safety net apparatus according to claim 5 in which the control device includes a shaft bearing that is radially displaceable with respect to an end of the winding shaft when exposed to predetermined radial forces.

* * * * *